US012384016B2

(12) United States Patent
Lu

(10) Patent No.: US 12,384,016 B2
(45) Date of Patent: Aug. 12, 2025

(54) POSITIONER

(71) Applicant: Haiyan Lu, Shenzhen (CN)

(72) Inventor: Haiyan Lu, Shenzhen (CN)

( * ) Notice: Subject to any disclaimer, the term of this patent is extended or adjusted under 35 U.S.C. 154(b) by 464 days.

(21) Appl. No.: 18/070,592

(22) Filed: Nov. 29, 2022

(65) Prior Publication Data

US 2023/0390916 A1 Dec. 7, 2023

Related U.S. Application Data

(63) Continuation-in-part of application No. 29/864,516, filed on Jun. 1, 2022, now Pat. No. Des. 982,997.

(51) Int. Cl.
*B25H 7/04* (2006.01)

(52) U.S. Cl.
CPC .................................... *B25H 7/045* (2013.01)

(58) Field of Classification Search
CPC ...................................................... B25H 7/045
USPC ........................................... 33/574, 644, 666
See application file for complete search history.

(56) References Cited

U.S. PATENT DOCUMENTS

| | | | | | |
|---|---|---|---|---|---|
| 726,086 | A * | 4/1903 | McAlpine | B25H 7/04 | 33/574 |
| 3,403,623 | A * | 10/1968 | Blackwood | B41K 1/36 | 101/368 |
| 4,353,759 | A * | 10/1982 | Stallings | B44C 7/00 | 156/289 |
| 4,382,337 | A * | 5/1983 | Bendick | A47G 1/205 | 33/574 |
| 4,473,957 | A * | 10/1984 | Faulkner | B25H 7/04 | 33/666 |
| 4,512,084 | A * | 4/1985 | Lieberman | A47G 1/205 | 33/574 |
| 5,233,760 | A * | 8/1993 | Patterson | G01C 9/28 | 33/376 |
| 5,253,421 | A * | 10/1993 | Landmark | B43L 9/04 | 33/760 |
| 5,867,917 | A * | 2/1999 | Karon | A47G 1/205 | 33/666 |
| 6,574,880 | B2 * | 6/2003 | Lombardo | B25H 7/04 | 33/666 |
| 6,739,065 | B2 * | 5/2004 | Hofmeister | A47G 1/205 | 33/666 |
| 7,293,925 | B1 * | 11/2007 | Sanseviero | B43K 23/08 | 401/98 |
| 7,506,450 | B2 * | 3/2009 | Spaulding | G01C 9/26 | 248/205.3 |

(Continued)

*Primary Examiner* — George B Bennett
(74) *Attorney, Agent, or Firm* — HOWARD M COHN and Associates, LLC

(57) ABSTRACT

A positioner includes a base, a marking component, and a first mounting component. The marking component includes a marking portion and a connecting portion connected with each other. The marking portion is configured to set a mark onto a mounting surface. The connecting portion is inserted into the base. The first mounting component is detachably connected to the connecting portion. An end of the first mounting component distal from the connecting portion is configured to connect to a mounting object. Each fastening structure on a back surface of the mounting object is fixedly connected to a hanging structure via the first mounting component. A plurality of matching marks are made onto the mounting surface through a plurality of positioners.

10 Claims, 10 Drawing Sheets

(56) References Cited

U.S. PATENT DOCUMENTS

| | | | | |
|---|---|---|---|---|
| 8,869,410 | B1 * | 10/2014 | Callahan | A61C 7/146<br>33/514 |
| 10,149,559 | B2 * | 12/2018 | Marks | A47G 1/205 |
| 10,518,403 | B2 * | 12/2019 | Weitsman | B25H 7/045 |
| 11,291,317 | B2 * | 4/2022 | Weitsman | B25H 7/045 |
| 12,263,572 | B1 * | 4/2025 | Conklin | B25H 7/04 |
| 2002/0095812 | A1 * | 7/2002 | Newman | B25H 7/04<br>33/613 |
| 2004/0216319 | A1 * | 11/2004 | Muchnik | B25H 7/045<br>33/666 |
| 2006/0196069 | A1 * | 9/2006 | Groepper | A47G 1/205<br>33/613 |
| 2007/0283588 | A1 * | 12/2007 | Gardner | F16B 15/02<br>33/666 |
| 2009/0193674 | A1 * | 8/2009 | Megahed | A47G 1/205<br>33/666 |
| 2014/0166834 | A1 * | 6/2014 | Kuroyanagi | F16M 13/02<br>248/231.91 |

* cited by examiner

POSITIONER

TECHNICAL FIELD

The present disclosure relates to a technical field of house and home, and in particular to a positioner.

BACKGROUND

Generally, a home decor object, such as a hanging picture, a bathroom mirror, a lamp, a build block board, etc., is provided on its back surface with a fastening structure, such as a screw, a hanging hole, etc. The home decor object is only fixed to a mounting surface such as a wall surface by the fastening structure and a fastening component cooperated with the fastening structure.

Some home decor objects, such as hanging pictures, are relatively large and hung with their back surfaces against the mounting surface. In order to fasten the home decor object, more than two fastening structures are typically disposed on the back surface of the home decor object. In a case where there are more than two fastening structures, it is cumbersome to position these fastening structures since they are disposed on the back surface of the home decor object. After a mounting position is determined on the mounting surface, a user generally needs to measure positions of the fastening structures with respect to the home decor object and a distance between the fastening structures; and then drill holes or attach fastening screws in the mounting surface such as the wall surface. The fastening structures on the back surface of the home decor object are symmetrically arranged at the same level. If there exists a deviation in the distance between the drilled holes, new holes need to be drilled, which influences the appearance of the wall surface. Or, if there exists a deviation in the horizontal heights of the two drilled holes, the home decor object is tilted after installation, thereby diminishing the beauty of the home decor object.

SUMMARY

Embodiments of the present disclosure provide a positioner, which enables no deviation in a hanging structure cooperated with the mounting object, thereby keeping the mounting object straight with no tilt after installation.

An embodiment of the present disclosure provides a positioner, including: a base, a marking component, and a first mounting component.

The marking component includes a marking portion and a connecting portion connected with each other. The marking portion is configured to set a mark onto a mounting surface. The connecting portion is inserted into the base.

The first mounting component is detachably connected to the connecting portion. An end of the first mounting component distal from the connecting portion is configured to connect to a mounting object.

Optionally, a printing-dyeing structure is disposed on the marking portion, and the printing-dyeing structure is configured to print the mark onto the mounting surface.

Optionally, a tip structure is disposed on the marking portion, and the tip structure is configured to drill a positioning hole in the mounting surface to form the mark.

Optionally, the connecting portion is detachably connected to the base, and the connecting portion is configured to be limited to different positions of the base.

Optionally, a thread is disposed on an outer surface of the connecting portion, a first threaded hole is defined on the base, and the connecting portion is threaded to the first threaded hole.

Optionally, a second threaded hole is defined at an end of the connecting portion away from the marking portion, and the first mounting component is threaded to the second threaded hole.

Optionally, the base includes a substrate, a first protruding portion and a second protruding portion. The first protruding portion and the second protruding portion are disposed on a same side of the substrate.

The first protruding portion is of a hollow structure, the first threaded hole is defined in a middle of the first protruding portion, and a first opening corresponding to the first protruding portion is defined on the substrate.

The second protruding portion is of a hollow structure, and a second mounting component is disposed in the second protruding portion. The second mounting component is different from the first mounting component.

Optionally, the base further includes a third protruding portion. The third protruding portion and the second protruding portion are disposed on a same side of the substrate. the third protruding portion is of a hollow structure, and a third mounting component is disposed in the third protruding portion. The third mounting component, the second mounting component and the first mounting component are different from one another.

Optionally, the second protruding portion and the third protruding portion are disposed on two opposite sides of the first protruding portion. A second opening corresponding to the second protruding portion is defined on the substrate, and a third opening corresponding to the third protruding portion is defined on the substrate. The second mounting component is inserted into the second opening, and the third mounting component is inserted into the third opening.

Optionally, the positioner further includes a cover. The cover covers the marking portion.

In the embodiments of the present disclosure, the first mounting component is detachably connected to the connecting portion of the marking component, and the end of the first mounting component away from the connecting portion is connected to a mounting object (a home decor object such as a hanging picture, a bathroom mirror, a lamp, a building block board, etc.). At least two fastening structures such as hanging holes are disposed on the back surface of the mounting object, and each hanging hole is configured to be sleeved over one first mounting component. The marking component is configured to make a mark onto a mounting surface such as a wall surface. Each fastening structure on the back surface of the mounting object is installed with one positioner, and each positioner is configured to make one mark onto the mounting surface. Then, a hanging structure such as a drilled hanging hole or an attached fastening screw is disposed corresponding to each mark. Each fastening structure on the back surface of the mounting object may be fixedly connected to the hanging structure via the first mounting component. The mounting object is kept straight when hung on the mounting surface. A plurality of matching marks are made on the mounting surface by a plurality of positioners. Thus, a plurality of hanging structures determined according to the plurality of marks are at the same level. Besides, a spacing between the plurality of marks is an actual distance of the plurality of fastening structures on the back surface of the mounting object, and there is no deviation in the spacing between the plurality of marks.

Thus, according to the positioner of the embodiments, the plurality of marks corresponding to the plurality of fastening structures on the back surface of the mounting object are at the same level, and the spacing between any two marks is equal to the spacing between the corresponding fastening structures. Correspondingly, after the hanging structure corresponding to each mark is disposed, the plurality of hanging structures are matched one-by-one to the plurality of fastening structures. There is no deviation in the hanging structures, which avoids the situation where the hanging structures need to be redisposed due to their deviation, thus having no influence on the mounting surface. After the mounting object is hung on the mounting surface through one-by-one connection between the plurality of first mounting components and the plurality of hanging structures, the plurality of hanging structures are at the same level, thereby keeping the mounting object straight with no tilt after installation.

BRIEF DESCRIPTION OF THE DRAWINGS

In order to more clearly illustrate technical solutions in embodiments of the present disclosure, a brief description of drawings required for describing the embodiments is given below. The drawings described below are merely some embodiments of the present disclosure. For those skilled in art, other drawings may be obtained without any creative thinking.

For a more complete understanding of the present disclosure and its beneficial effects, the description is made hereinafter with reference to the accompanying drawings. In the following description, identical reference numerals indicate identical portions.

DETAILED DESCRIPTION OF THE EMBODIMENTS

Technical solutions in embodiments of the present disclosure are clearly and completely described below with reference to accompanying drawings in the embodiments of the present disclosure. Obviously, the embodiments described herein are merely a portion of embodiments of the present disclosure, not all of them. Based on the embodiments of the present disclosure, all other embodiments obtained by those skilled in art without creative thinking fall within a scope of protection of the present disclosure.

Figure 1:
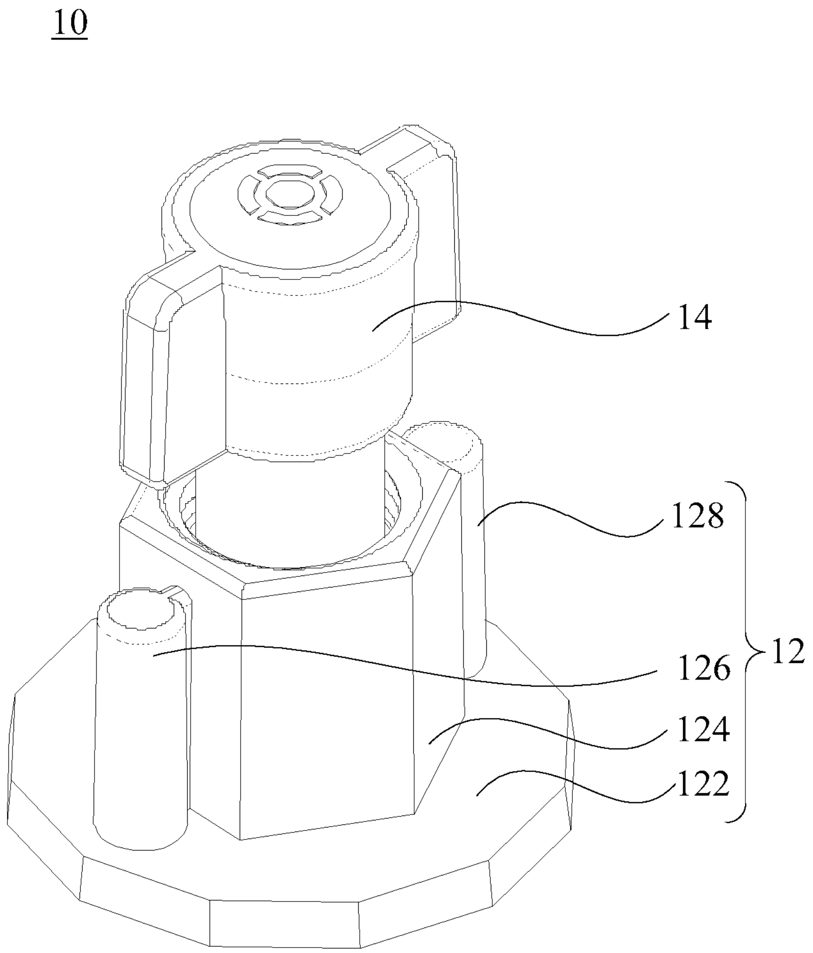
FIG. 1 is a structural schematic diagram of a positioner according to one embodiment of the present disclosure.
Figure 2:
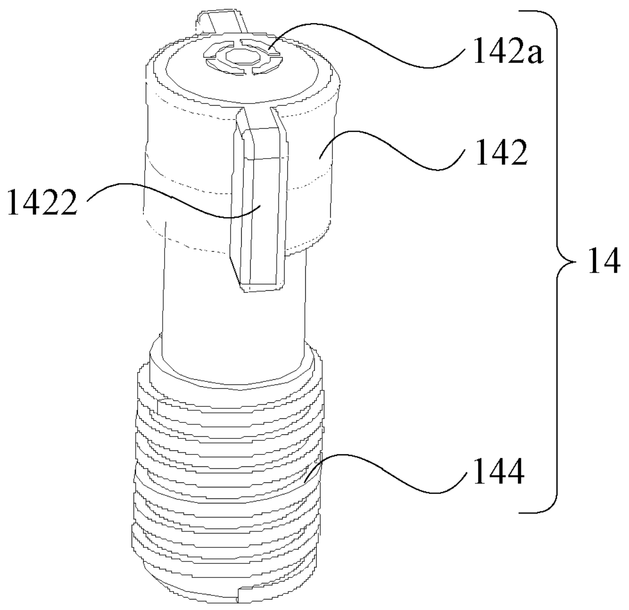
FIG. 2 is a structural schematic diagram of a marking component in the positioner as shown in FIG. 1.
Figure 3:
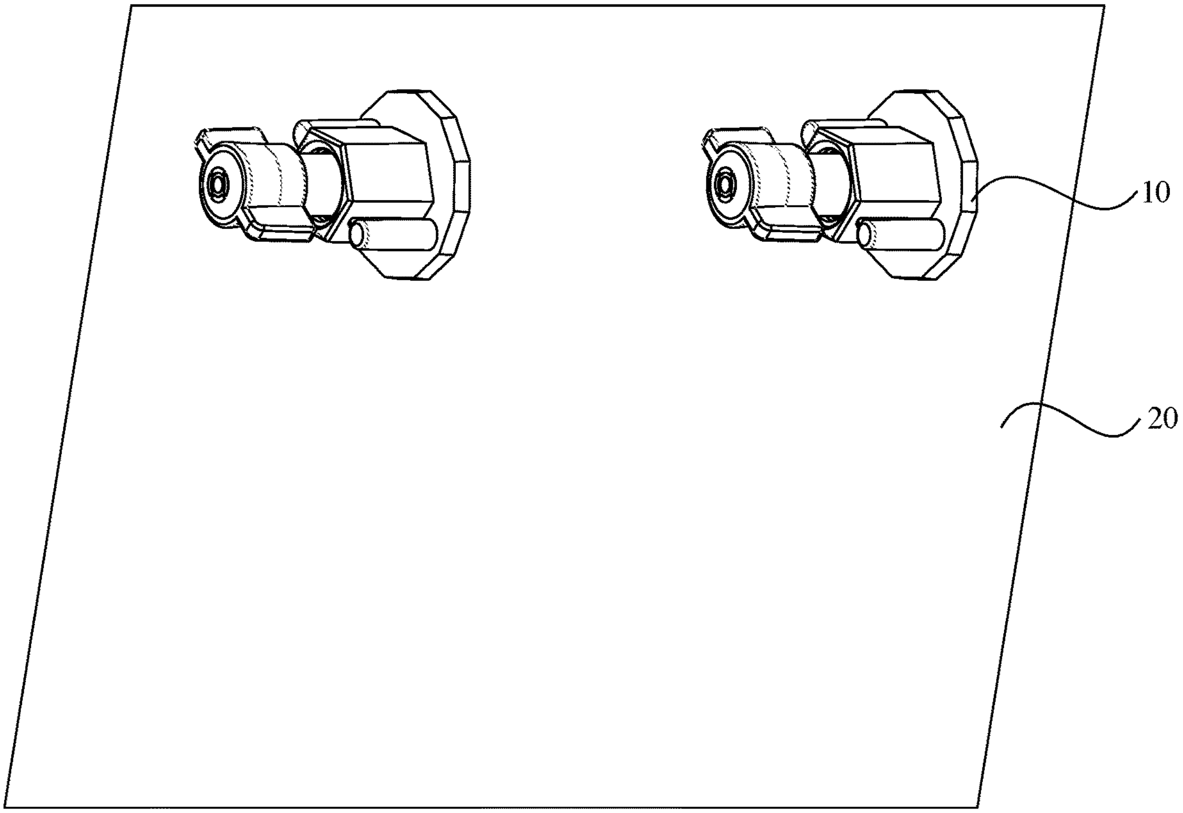
FIG. 3 is a structural schematic diagram of the positioner and a mounting object according to one embodiment of the present disclosure.
Figure 4:
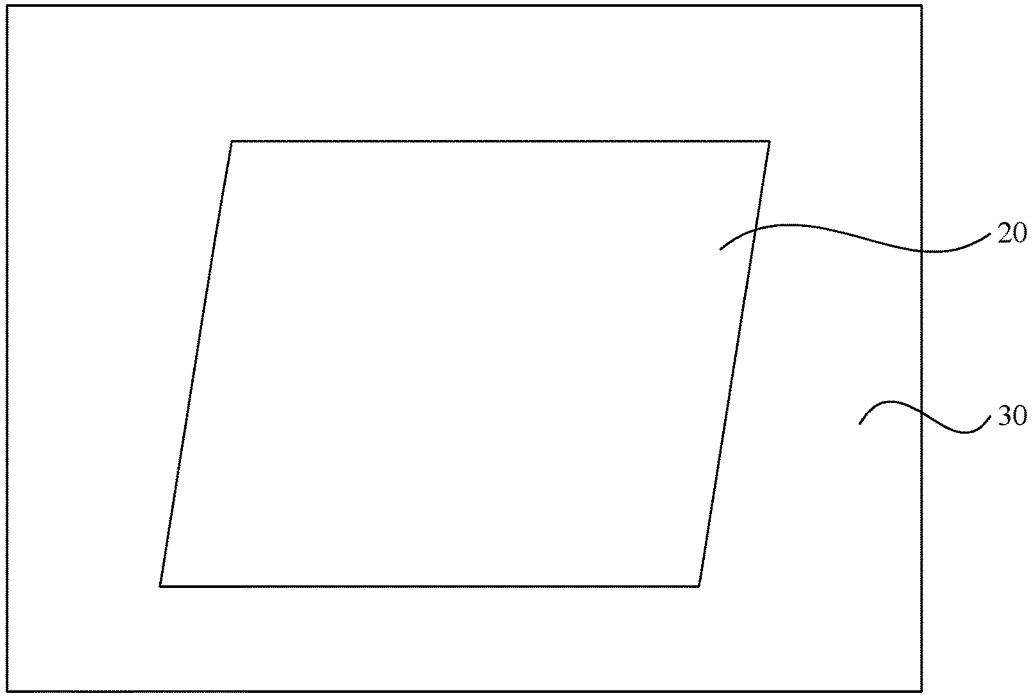
FIG. 4 is a structural schematic diagram of the mounting object and a mounting surface according to one embodiment of the present disclosure.

The embodiments of the present disclosure provide a positioner. FIG. 1 is a schematic structural diagram of a positioner according to an embodiment of the present disclosure, and FIG. 2 is a schematic structural diagram of a marking component in the positioner as shown in FIG. 1. The positioner 10 includes a base 12, a marking component 14, and a first mounting component 16. The base 12 is configured as a load-bearing structure for the positioner 10. The marking component 14 includes a marking portion 142 and a connecting portion 144 connected to each other. FIG. 3 is a schematic structural diagram of a positioner and a mounting object according to an embodiment of the present disclosure. FIG. 4 is a schematic structural diagram of a mounting object and a mounting surface according to an embodiment of the present disclosure. The marking portion 142 is configured to set a mark onto a mounting surface 30, and the connecting portion 144 is inserted into the base 12. The first mounting component 16 is detachably connected to the connecting portion 144. An end of the first mounting component 16 away from the connecting portion 144 is configured to connect to a mounting object 20 (a home decor object such as a hanging picture, a bathroom mirror, a lamp, a building block board, etc.).

Figure 5:
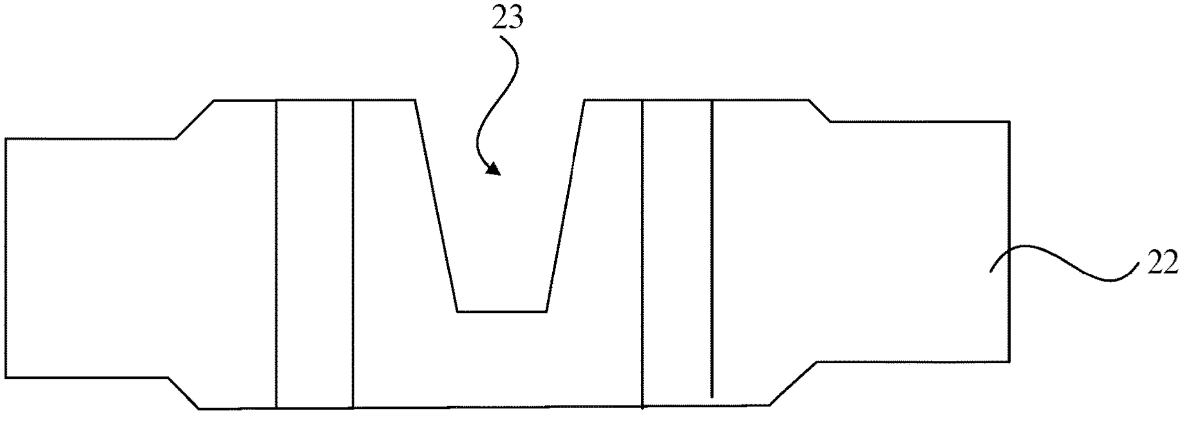
FIG. 5 is a structural schematic diagram of a fastening structure of the mounting object as shown in FIG. 4.
Figure 6:
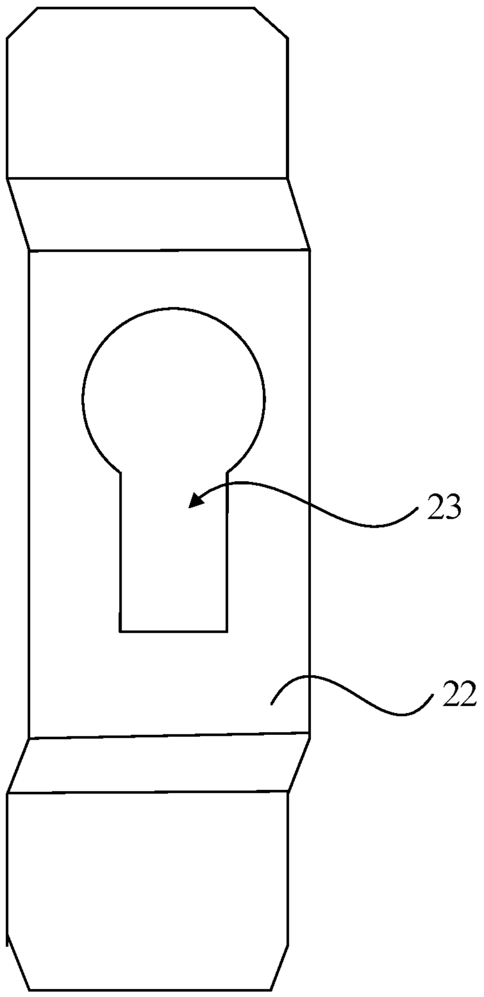
FIG. 6 is another structural schematic diagram of the fastening structure of the mounting object as shown in FIG. 4.

FIG. 5 is a structural schematic diagram of the fastening structure of the mounting object as shown in FIG. 4, and FIG. 6 is another structural schematic diagram of the fastening structure of the mounting object as shown in FIG. 4. At least two fastening structures 22 may be disposed on a back surface of the mounting object 20. The fastening structures 22 are defined with hanging holes 23, each of which is sleeved over one first mounting component 16. The marking component 14 is configured to make the mark onto the mounting surface 30 such as the wall surface. In this way, each fastening structure 22 on the back surface of the mounting object 20 is installed with one positioner 10, and each positioner 10 is configured to make one mark onto the mounting surface 30. Then, a hanging structure (not shown in the drawings), such as a drilled hanging hole or an attached fastening screw, is disposed corresponding to each mark. Each fastening structure 22 on the back surface of the mounting object 20 may be fixedly connected to the hanging structure via the first mounting component 16. The mounting object 20 is kept straight when hung on the mounting surface 30. A plurality of matching marks may be set onto the mounting surface 30 using a plurality of positioners 10. Thus, a plurality of hanging structures determined according to the plurality of marks are at the same level. In addition, a spacing between the plurality of marks is an actual distance of the plurality of fastening structures 22 on the back surface of the mounting object 20. There is no deviation in the spacing between the plurality of marks.

Thus, using the positioner 10 according to the embodiments, the plurality of marks corresponding to the plurality of fastening structures 22 on the back surface of the mounting object 20 are at the same level, and the spacing between any two marks is equal to the spacing between the corresponding fastening structures 22. Correspondingly, after the hanging structure is disposed corresponding to each mark, the plurality of hanging structures are matched one-by-one to the plurality of fastening structures 22. There is no deviation in the hanging structures, which avoids the situation where the hanging structures need to be redisposed due to their deviation, thus having no influence on the mounting surface 30. After the mounting object 20 is hung on the mounting surface 30 through one-by-one connection between the plurality of hanging structures and the plurality of first mounting components 16, the plurality of hanging structures are at the same level, thereby keeping the mounting object 20 straight with no tilt after installation.

Optionally, a printing-dyeing structure 142*a* is disposed at the marking portion 142. The printing-dyeing structure 142*a* is configured to print the mark onto the mounting surface. Exemplarily, the printing-dyeing structure 142*a* of the marking portion 142 has a function similar to a seal. When an external thrust is applied to the printing-dyeing structure 142*a* and presses it against the mounting surface, the printing-dyeing structure 142*a* is configured to make the mark onto the mounting surface such as the wall surface. A material that is reused many times may be stored in the printing-dyeing structure 142*a*, so that there is no need to replace the printing-dyeing structure 142*a* or supplement the material for printing-dyeing each time, which is convenient to use. A shape of the mark may be set as required. For example, the mark may be a combination of one or more of a solid circle, a circular ring, a cross, and an X shape. Accordingly, the printing-dyeing structure 142*a* having the corresponding shape is disposed, so as to print the mark. A color of the mark may be set as required. For example, the mark may be a combination of one or more of red, blue, green, black, purple, etc.

Figure 7:
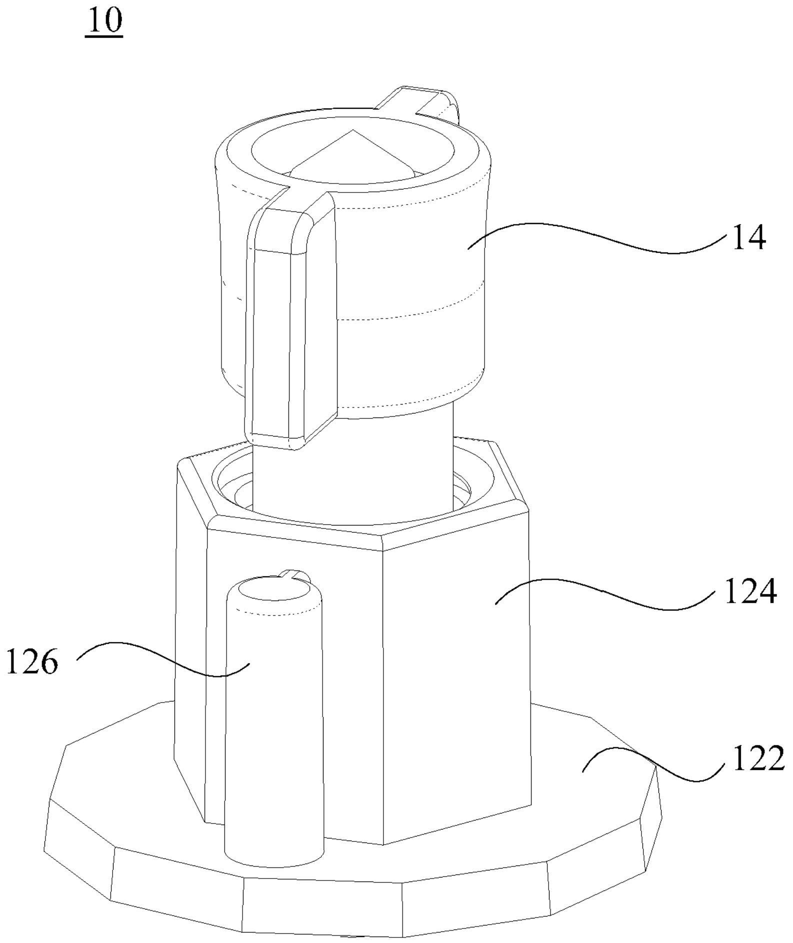
FIG. 7 is another structural schematic diagram of the positioner according to one embodiment of the present disclosure.
Figure 8:
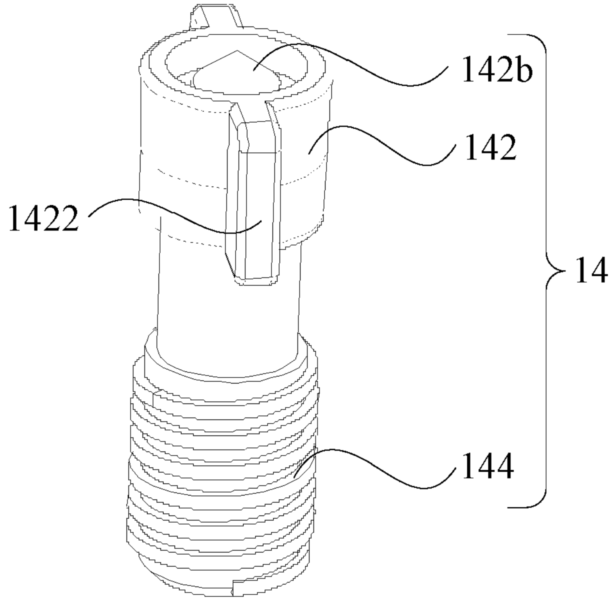
FIG. 8 is a structural schematic diagram of the marking component in the positioner as shown in FIG. 7.

FIG. 7 is another schematic structural diagram of a positioner according to an embodiment of the present disclosure, and FIG. 8 is a schematic structural diagram of a marking component in the positioner as shown in FIG. 7. Optionally, a tip structure 142*b* may be disposed at the marking portion 142. The tip structure 142*b* is configured to drill a positioning hole in the mounting surface, so as to form the mark. Exemplarily, the tip structure 142*b* of the marking portion 142 may have a conical structure or other structure with a tip. When an external thrust is applied to the tip structure 142*b* and presses it against the mounting surface, the tip structure 142*b* is configured to drill a positioning hole such as a round concave point in the mounting surface such as the wall surface, and the positioning hole forms the mark. There is no color but only one positioning hole left on the mounting surface. Subsequently, the positioning hole is processed to form the hanging structure such as the hanging hole that matches the fastening structure on the back surface of the mounting object.

Figure 9:
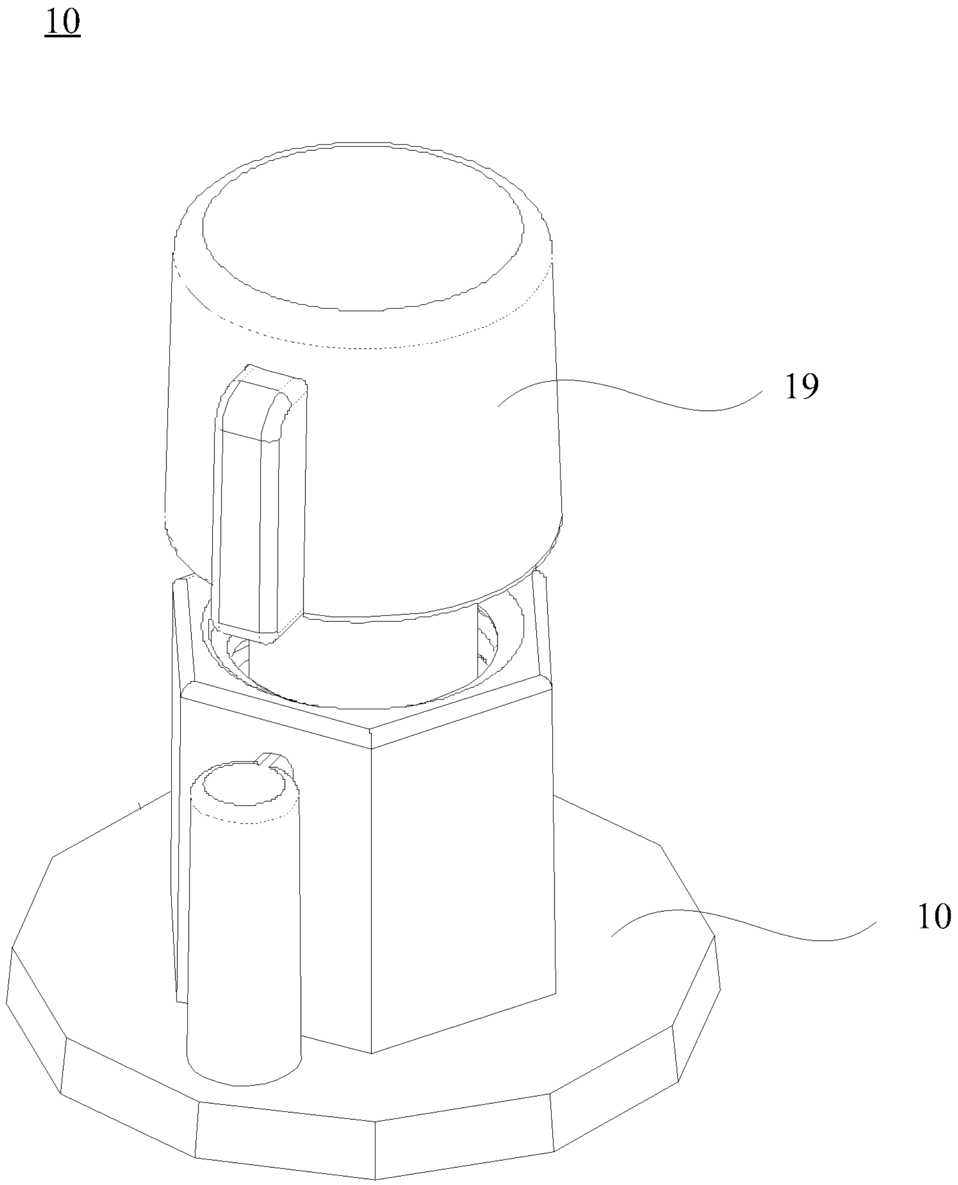
FIG. 9 is still another structural schematic diagram of the positioner according to one embodiment of the present disclosure.
Figure 10:
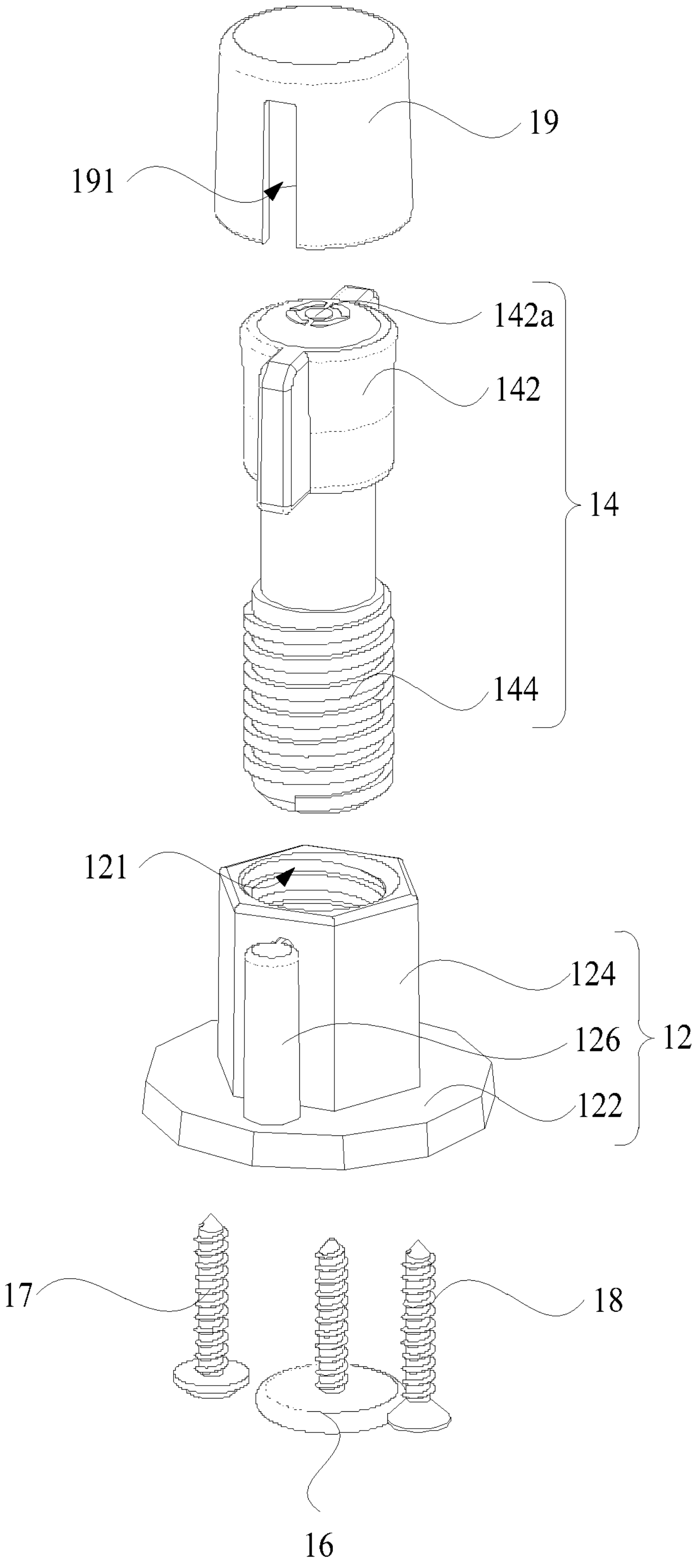
FIG. 10 is an exploded schematic diagram of the positioner as shown in FIG. 9.
Figure 11:
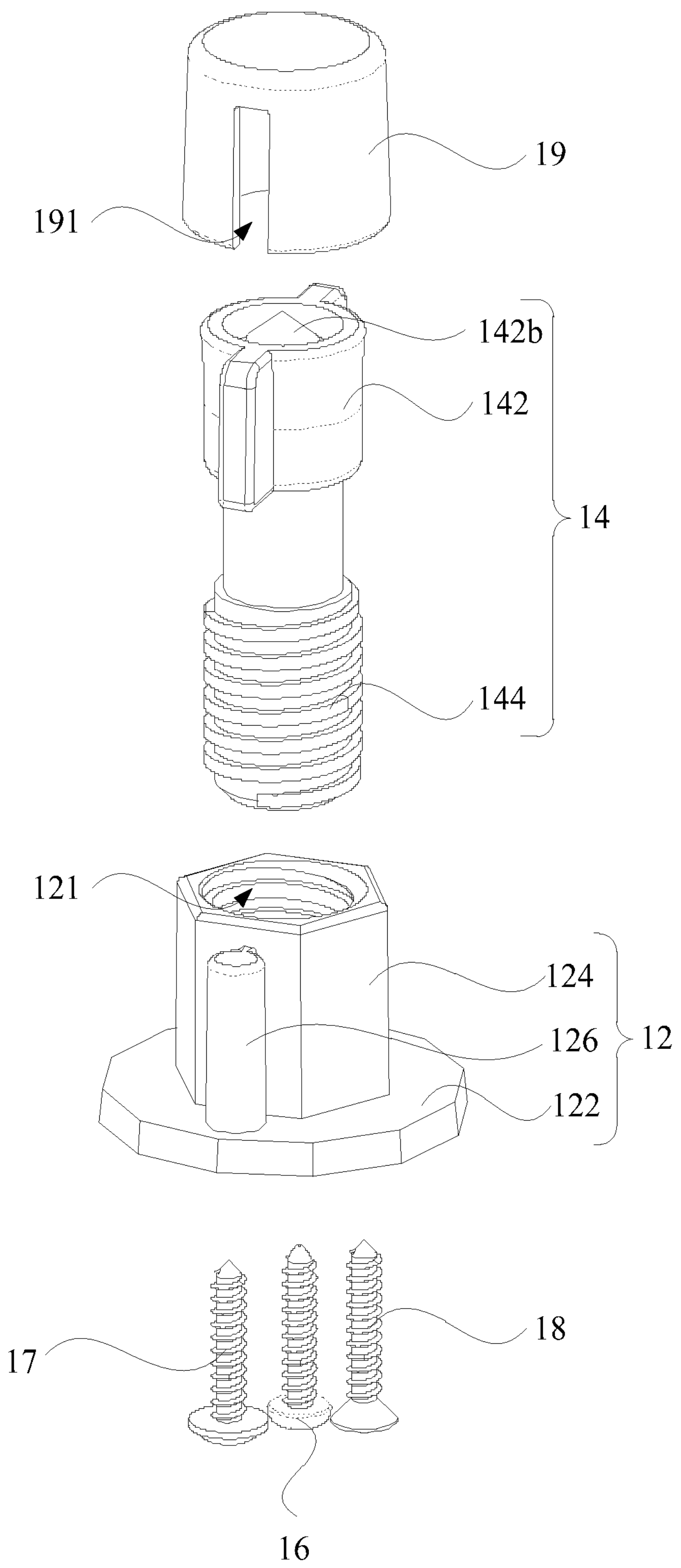
FIG. 11 is another exploded schematic diagram of the positioner as shown in FIG. 9.

FIG. 9 is still another schematic structural diagram of a positioner according to an embodiment of the present disclosure. FIG. 10 is a schematic exploded diagram of the positioner as shown in FIG. 9. FIG. 11 is another schematic exploded diagram of the positioner as shown in FIG. 9. The positioner 10 further includes a cover 19, which covers the marking portion 142 and plays a role of protecting the marking portion 142. The cover 19 may cover only the marking portion 142, or cover the marking portion 142 and the first protruding portion 124. The cover 19 may be in snap-fit with the marking portion 142, so as to improve connection stability therebetween. In some embodiments, structures cooperated with each other may be disposed on the cover 19 and the marking portion 142. For example, a magnetic component may be respectively disposed on the cover 19 and the marking portion 142, so that magnetic connection is realized between the cover 19 and the marking portion 142 through two magnetic components.

In some embodiments, a convex rib 1422 is disposed on an outer side of the marking portion 142, and an opening groove 191 is defined on the cover 19 corresponding to the convex rib 1422. The convex rib 1422 is disposed in the opening groove 191, and the convex rib 1422 is in interference fit with the opening groove 191. As such, the cover 19 is in snap-fit with the marking portion 142, which strengthens connection strength between the cover 19 and the marking portion 142, thereby solving the problem that the cover 19 easily falls off Optionally, a quantity of convex ribs 1422 may be set as required. For example, two convex ribs 1422 are disposed on the outer side of the marking portion 142, and are symmetrically arranged on two sides of the marking portion 142. In addition, two opening grooves 191 are defined on the cover 19 corresponding to the two convex ribs 1422. The two opening grooves 191 are in one-to-one correspondence with the two convex ribs 1422. For another example, three convex ribs 1422 are disposed on the outer side of the marking portion 142, and are evenly disposed around an outer periphery of the marking portion 142. In addition, three opening grooves 191 are defined on the cover 19 corresponding to the three convex ribs 1422. The three opening grooves 191 are in one-to-one correspondence with the three convex ribs 1422.

The convex rib 1422 may extend along an end of the marking portion 142 away from the connecting portion 144 toward the connecting portion 144. The convex rib 1422 may extend to the connecting portion 144. Alternatively, the convex rib 1422 may extend to a middle of the marking portion 142, with a certain distance spaced apart from the connecting portion 144. A length of the convex rib 1422 may be set as required, which is not limited herein.

The connecting portion 144 is detachably connected to the base 12, and the connecting portion 144 is configured to be limited to different positions of the base 12. The connecting portion 144 may be separated from the base 12, and it may also be disposed at different positions of the base 12, so that a distance between the connecting portion 144 and the mounting object is adjustable. That is, a distance between the mounting object and the marking portion 142 is adjustable. In this way, the distance between the marking portion 142 and the mounting object is closer to the distance between the first mounting component 16 and the mounting object.

Specifically, a thread is disposed on an outer surface of the connecting portion 144, and a first threaded hole 121 is defined on the base 12, so that the connecting portion 144 is threaded to the first threaded hole 121. Through the threaded connection, the connection between the connecting portion 144 and the first threaded hole 121 of the base 12 is realized, and also a relative position between the connecting portion 144 and the base 12 is adjustable; that is, the distance between the connecting portion 144 and the mounting object is adjustable.

Optionally, a second threaded hole 1461 is defined at an end of the connecting portion 144 away from the marking portion 142, and the first mounting component 16 is threaded to the second threaded hole 1461. The first mounting component 16 is threaded to the connecting portion 144, so as to realize connection between the first mounting component 16 and the connecting portion 144. The first mounting component 16 may be a screw or a nut. An end of the first mounting component 16 is in snap-fit with the fastening structure on the back surface of the mounting object, and the other end of the first mounting component 16 is in threaded connection with the connecting portion 144, which may be understood as similar to installation in the hanging structure of the mounting surface.

In some embodiments, the connecting portion 144 and the marking portion 142 may be an integral structure, or may be split structures. The connecting portion 144 and the marking portion 142 are fixedly connected, such as by threading, welding, snap-fit, bonding, etc.

It is appreciated that second threaded holes 1461 of different sizes may be defined on the connecting portion 144 as required. In some other embodiments, a plurality of connecting portions 144 of different specifications may be disposed on the positioner 10 as required. Each time the positioner 10 is used, a connecting portion is selected from the connecting portion 144 of different specifications according to the fastening structure on the back surface of the mounting object. Second threaded holes 1461 of different sizes are defined on the connecting portions 144 of different specifications. The second threaded holes 1461 of different sizes correspond to first mounting components 16 of different specifications.

The base 12 includes a substrate 122, a first protruding portion 124 and a second protruding portion 126. The first protruding portion 124 and the second protruding portion 126 are arranged on the same side of the substrate 122. The first protruding portion 124 is of a hollow structure, and the first threaded hole 121 is defined in a middle of the first protruding portion 124. A first opening corresponding to the first protruding portion 124 is defined on the substrate 122. The second protruding portion 126 is of a hollow structure, and a second mounting component 17 is disposed in the second protruding portion 126. The second mounting component 17 is different from the first mounting component 16.

The first protruding portion 124 is configured to accommodate the connecting portion 144, and the second protruding portion 126 is configured to accommodate the second mounting component 17. The second mounting component 17 and the first mounting component 16 are of different types. The second mounting component 17 may be adapted to a mounting object with other fastening structure, or may be adapted to a mounting object in other mounting mode.

In some embodiments, the second mounting component 17 may be threaded into the second protruding portion 126. In some other embodiments, the second mounting component 17 may be snapped in the second protruding portion 126. For example, the second protruding portion 126 has a certain elasticity, an inner size of the second protruding portion 126 is slightly smaller than a size of the second mounting component 17, and the second mounting component 17 is in interference fit with the second protruding portion 126. As such, the second mounting component 17 may be determined from a wider selection range.

In some embodiments, the base 12 further includes a third protruding portion 128. The third protruding portion 128 and the second protruding portion 126 are arranged on the same side of the substrate 122, which is convenient to arrange the three protruding portions. The third protruding portion 128 is of a hollow structure, and a third mounting component 18 is disposed in the third protruding portion 128. The third mounting component 18, the second mounting component 17 and the first mounting component 16 are different from one another. The third mounting component 18, the second mounting component 17 and the first mounting component 16 may be of different types. The three mounting components may be adapted to mounting objects with three types of fastening structures, or may be adapted to mounting objects in three different mounting modes, thereby widening an application range of the positioner 10.

Exemplarily, in a case that the mounting object has been selected, and the fastening structure on the back surface of the mounting object has been disposed, one of three mounting components in the connecting portion 144, the second protruding portion 126 and the third protruding portion 128 of the positioner 10 may be selected as the first mounting component 16 according to the fastening structure on the back surface of the mounting object. The selected first mounting component is connected to the connecting portion 144, and is cooperated with the fastening structure, so as to realize positioning of the fastening structure corresponding to the mounting object on the mounting surface. For example, the first mounting component 16 as shown in FIG. is cooperated with the fastening structure 22 as shown in FIG. 5. For another example, the first mounting component 16 as shown in FIG. 11 is cooperated with the fastening structure 22 as shown in FIG. 6.

In some embodiments, the third mounting component 18 may be threaded into the third protruding portion 128. In some other embodiments, the third mounting component 18 may be snapped in the third protruding portion 128. For example, the third protruding portion 128 has a certain elasticity, an inner size of the third protruding portion 128 is slightly smaller than a size of the third mounting component 18, and the third mounting component 18 is in interference fit with the third protruding portion 128. As such, the third mounting component 18 may be determined from a wider selection range.

The second protruding portion 126 and the third protruding portion 128 are arranged on two opposite sides of the first protruding portion 124, making the overall appearance more symmetrical and beautiful. A second opening corresponding to the second protruding portion 126 is defined on the substrate 122, and a third opening corresponding to the third protruding portion 128 is defined on the substrate 122. The second mounting component 17 is inserted into the second opening, and the third mounting component 18 is inserted into the third opening. The second opening of the second protruding portion 126 and the third opening of the third protruding portion 128 face the same side, namely the side where the mounting object is located, and also the same side as the arrangement direction of the first mounting component 16, thereby being convenient to place the first mounting component 16, the second mounting component 17 and the third mounting component 18.

It should be noted that, in some other embodiments, the opening of the second protruding portion 126 and the opening of the third protruding portion 128 may be defined at a side away from the mounting object. That is, no opening is defined on the base 12 corresponding to the second protruding portion 126 and the third protruding portion 128. The second mounting component 17 and the third mounting component 18 are installed into the second protruding portion 126 and the third protruding portion 128 from a side away from the mounting object. In still other embodiments, the opening of the second protruding portion 126 and the opening of the third protruding portion 128 may be defined on different sides. For example, one is defined on a side facing the mounting object, and the other one is defined on a side away from the mounting object.

The first protruding portion 124, the second protruding portion 126 and the third protruding portion 128 may be arranged at intervals from one another, or may be arranged adjacent to one another. For example, the second protruding portion 126 and the third protruding portion 128 are arranged on two sides of the first protruding portion 124 and are both connected to the first protruding portion 124, which enhances the structural strength of the second protruding portion 126 and the third protruding portion 128, thereby preventing them from breaking easily. The first protruding portion 124, the second protruding portion 126 and the third protruding portion 128 may be integrally formed with the substrate.

The positioner provided in the embodiments of the present disclosure is detailed above. Herein, specific examples are used to explain the principle and implementation of the present disclosure. The foregoing embodiments are merely used to help understand the technical solution of the present disclosure and its core idea. In addition, for those skilled in the art, according to the idea of the present disclosure, there will be changes in the specific implementation and application. In summary, the content described herein should not be interpreted as a limitation on the present disclosure.

What is claimed is:

1. A positioner, comprising:

a base;

a marking component; and a first mounting component;

wherein the marking component comprises a marking portion and a connecting portion, the marking portion is connected with the connecting portion, the marking portion is configured to set a mark onto a mounting surface, and the connecting portion is inserted into the base; and the first mounting component is detachably connected to the connecting portion, an end of the first mounting component distal from the connecting portion is configured to connect to a mounting object.

2. The positioner according to claim 1, wherein a printing-dyeing structure is disposed on the marking portion, and the printing-dyeing structure is capable of printing the mark onto the mounting surface.

3. The positioner according to claim 1, wherein a tip structure is disposed on the marking portion, and the tip structure is capable of drilling a positioning hole in the mounting surface to form the mark.

4. The positioner according to claim 1, wherein the connecting portion is detachably connected to the base, and the connecting portion is capable of being limited to different positions of the base.

5. The positioner according to claim 4, wherein a thread is disposed on an outer surface of the connecting portion, a first threaded hole is defined on the base, and the connecting portion is threaded to the first threaded hole.

6. The positioner according to claim 5, wherein the base comprises:

a substrate;

a first protruding portion; and a second protruding portion;

wherein the first protruding portion and the second protruding portion are disposed on a same side of the substrate;

the first protruding portion is of a hollow structure, the first threaded hole is defined in a middle of the first protruding portion, and a first opening corresponding to the first protruding portion is defined on the substrate;

the second protruding portion is of a hollow structure, and a second mounting component is disposed in the second protruding portion; and the second mounting component is different from the first mounting component.

7. The positioner according to claim 6, wherein the base further comprises a third protruding portion; the third protruding portion and the second protruding portion are disposed on a same side of the substrate; the third protruding portion is of a hollow structure, and a third mounting component is disposed in the third protruding portion; and the third mounting component, the second mounting component and the first mounting component are different from one another.

8. The positioner according to claim 7, wherein the second protruding portion and the third protruding portion are disposed on two opposite sides of the first protruding portion: a second opening corresponding to the second protruding portion is defined on the substrate, and a third opening corresponding to the third protruding portion is defined on the substrate; and the second mounting component is inserted into the second opening, and the third mounting component is inserted into the third opening.

9. The positioner according to claim 4, wherein a second threaded hole is defined at an end of the connecting portion away from the marking portion, and the first mounting component is threaded to the second threaded hole.

10. The positioner according to claim 1, wherein the positioner further comprises a cover; and the cover covers the marking portion.

* * * * *